United States Patent
Ma

(10) Patent No.: US 11,760,832 B2
(45) Date of Patent: Sep. 19, 2023

(54) DISPERSANT POLYMER AND COMPOSITION COMPRISING THE SAME

(71) Applicant: AXALTA COATING SYSTEMS IP CO., LLC, Wilmington, DE (US)

(72) Inventor: Sheau-hwa Ma, West Chester, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 17/182,872

(22) Filed: Feb. 23, 2021

(65) Prior Publication Data

US 2021/0261719 A1 Aug. 26, 2021

Related U.S. Application Data

(60) Provisional application No. 62/981,863, filed on Feb. 26, 2020.

(51) Int. Cl.
*C08G 59/24* (2006.01)
*C08G 59/32* (2006.01)
(Continued)

(52) U.S. Cl.
CPC ........... *C08G 59/245* (2013.01); *C08G 59/32* (2013.01); *C08G 65/08* (2013.01);
(Continued)

(58) Field of Classification Search
CPC ...... C08G 59/245; C08G 59/32; C08G 65/08; C08G 65/33306; C08K 5/09; C08K 5/17; C09D 17/001
(Continued)

(56) References Cited

U.S. PATENT DOCUMENTS

| 6,077,884 A | 6/2000 | Hess et al. |
| 6,472,463 B1 | 10/2002 | Ma |

(Continued)

FOREIGN PATENT DOCUMENTS

| CN | 1409733 A | 4/2003 |
| CN | 107075080 A | 8/2017 |

OTHER PUBLICATIONS

Dow Chemical Company, "D.E.N. 431", 2022 (Year: 2022).*

(Continued)

*Primary Examiner* — David T Karst
(74) *Attorney, Agent, or Firm* — Lorenz & Kopf, LLP

(57) ABSTRACT

A polymer includes the reaction product of A, B, and C, and optionally D, wherein:
A is a polyepoxide that is:
the condensation product of phenol, formaldehyde, and epichlorohydrin;
the condensation product of bisphenol A, formaldehyde, and epichlorohydrin; or
a combination of said condensation products;
B is at least one polyoxyalkylene with a terminal primary amine group wherein each polyoxyalkylene comprises an ethyleneoxy moiety and a propyleneoxy moiety and independently has the following structure:

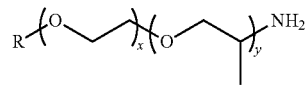

wherein R is a hydrogen atom or a $C_1$-$C_4$ group, and wherein each of x and y is independently from 0 to about 500 and $x+y>0$; and (Continued)

C is an anchoring compound that is:
- a secondary amine;
- a monocarboxylic acid;
- a cyclic imide; or
- a combination thereof, and D is an alkylating agent.

This polymer is included in a composition that further includes a compound such as a particulate solid.

20 Claims, 1 Drawing Sheet

(51) Int. Cl.
| | | |
|---|---|---|
| C08G 65/08 | (2006.01) | |
| C08G 65/333 | (2006.01) | |
| C08K 5/09 | (2006.01) | |
| C08K 5/17 | (2006.01) | |
| C09D 17/00 | (2006.01) | |

(52) U.S. Cl.
CPC ......... *C08G 65/33306* (2013.01); *C08K 5/09* (2013.01); *C08K 5/17* (2013.01); *C09D 17/001* (2013.01)

(58) Field of Classification Search
USPC .......................................................... 528/421
See application file for complete search history.

(56) References Cited

U.S. PATENT DOCUMENTS

| | | | |
|---|---|---|---|
| 2005/0020735 A1* | 1/2005 | Krappe | .................. C09D 7/61 528/121 |
| 2017/0292030 A1 | 10/2017 | Göbelt et al. | |

OTHER PUBLICATIONS

Huntsman Corporation, "The JEFFAMINE Polyetheramines", 2007 (Year: 2007).*

EPO, European Extended Search Report issued in EP App. No. 21159153.2-1102, dated Jul. 19, 2021.

* cited by examiner

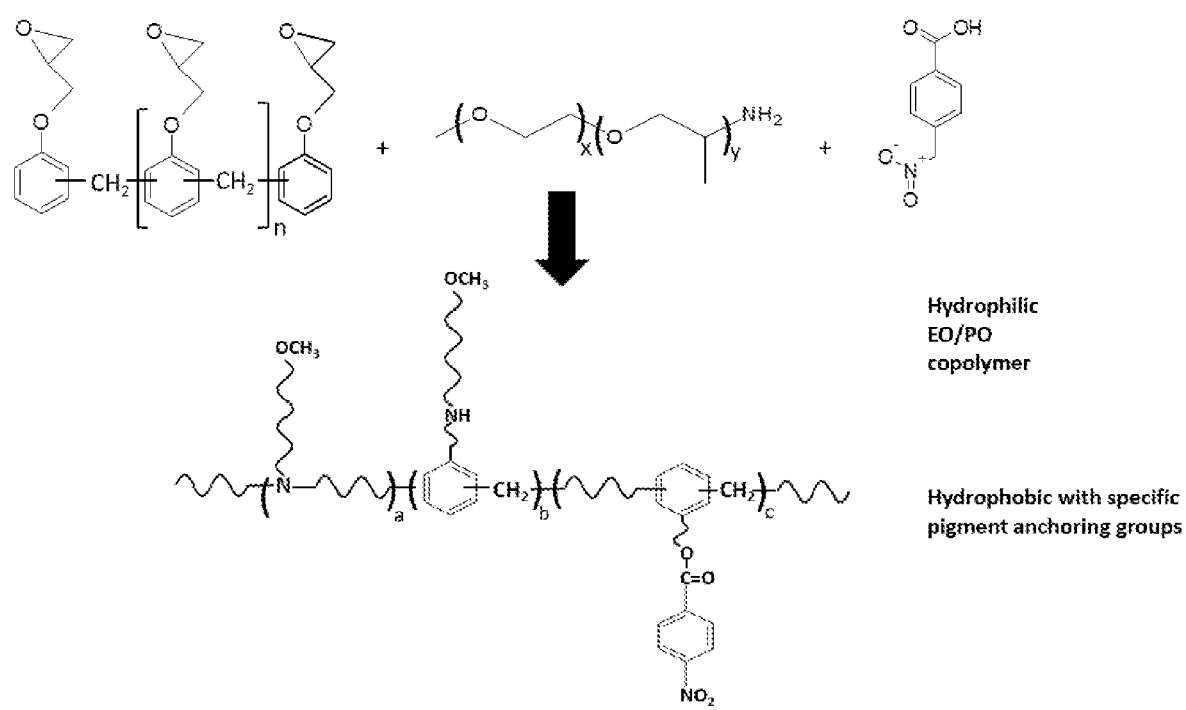

DISPERSANT POLYMER AND COMPOSITION COMPRISING THE SAME

CROSS-REFERENCE TO RELATED APPLICATIONS

This application claims the benefit of U.S. Provisional Application No. 62/981,863 filed Feb. 26, 2020, which is hereby incorporated in its entirety by reference.

TECHNICAL FIELD

The present disclosure generally relates to a polymer, e.g. a dispersant polymer, and a composition that includes the polymer. More specifically, this disclosure relates to a polymer that includes the reaction product of A, B, and C, and optionally D, wherein A is a particular polyepoxide, B is at least one polyoxyalkylene with a terminal primary amine group, C is a particular anchoring compound, and D is an alkylating agent.

BACKGROUND

Polymeric materials can be effective for dispersing pigments in aqueous and organic solvents and used to form pigment dispersions of uniform color that are useful in formulating waterborne and solvent borne coating compositions. Such pigment dispersions are widely used, for example, in exterior coating for automobiles and trucks.

Most pigment dispersants include random copolymers but some also include structured pigment dispersants. Graft copolymers are generally composed of a macromonomer grafted onto a polymer backbone. These copolymers typically have one or more groups known as pigment anchoring groups attached to either the macromonomer, the backbone, or both. These pigment anchoring groups are designed to adsorb on the surface of a pigment particle and thereby anchor the polymer to the pigment surface.

The graft copolymers that include pigment anchoring groups tend to suffer from significant drawbacks. For instance, the pigment anchoring groups may not selectively adsorb certain pigment types and/or can be displaced from pigment surfaces by polar solvents or other polar groups present in a composition. Ineffective anchoring of the polymers to a pigment particle surface is highly undesired, since it can allow the pigment particles to flocculate, or cluster together, and can result, ultimately, in coatings of poor color quality.

Accordingly, it is desirable to improve the performance of dispersants, and in particular to develop dispersants having an increased effectiveness in dispersing a wide range of pigments, especially in coating compositions. Furthermore, other desirable features and characteristics will become apparent from the subsequent detailed description of the disclosure and the appended claims.

BRIEF SUMMARY

This disclosure provides a polymer that includes the reaction product of A, B, and C, and optionally D, wherein:
A is a polyepoxide that is:
the condensation product of phenol, formaldehyde, and epichlorohydrin;
the condensation product of bisphenol A, formaldehyde, and epichlorohydrin; or
a combination of said condensation products;

B is at least one polyoxyalkylene with a terminal primary amine group wherein each polyoxyalkylene comprises an ethyleneoxy moiety and a propyleneoxy moiety and independently has the following structure:

$$R\left(O\diagup\right)_x\left(O\diagdown\right)_y NH_2$$

wherein R is a hydrogen atom or a $C_1$-$C_4$ group, and
wherein each of x and y is independently from 0 to about 500 and x+y>0; and
C is an anchoring compound that is:
a secondary amine;
a monocarboxylic acid;
a cyclic imide; or
a combination thereof, and
D is an alkylating agent.

This disclosure also provides a dispersion including water or a non-polar solvent, a color pigment, and the aforementioned polymer.

This disclosure also provides a composition that includes a compound and the aforementioned polymer.

BRIEF DESCRIPTION OF THE DRAWING

The present disclosure will hereinafter be described in conjunction with the following drawing, wherein:

FIG. 1 is a synthesis scheme of one non-limiting embodiment of the polymer of this disclosure.

DETAILED DESCRIPTION

The following detailed description is merely exemplary in nature and is not intended to limit the polymers or compositions described herein. Furthermore, there is no intention to be bound by any theory presented in the preceding background or the following detailed description.

Embodiments of the present disclosure are generally directed to polymers, e.g. dispersant polymers, methods for forming the same, compositions including the polymer, and methods of forming the composition. For the sake of brevity, conventional techniques related to composition formation may not be described in detail herein. Moreover, the various tasks and process steps described herein may be incorporated into a more comprehensive procedure or process having additional steps or functionality not described in detail herein. In particular, various steps in the manufacture of polymers and compositions are well-known and so, in the interest of brevity, many conventional steps will only be mentioned briefly herein or will be omitted entirely without providing the well-known process details.

Polymer:

This disclosure provides a polymer, as described below. The polymer may be a single polymer but more likely is a mixture of various individual polymers that each are as described herein. Similarly, all values of x, y, and n described herein may be alternatively described as average values or discrete values, as would be understood by one of skill in the art. Moreover, throughout the specification, the terminology "polymer" and "resin" may be interchangeable.

The polymer can be a random polymer, a block polymer, or a comb polymer. The polymer can be alternatively described as a dispersant polymer. The terminology "dispersant polymer" describes that the polymer may be used for, or capable of, dispersing a compound in a composition. For example, the dispersant polymer may be used for, or capable of, dispersing a compound in a composition that includes a solvent or continuous phase, such as an aqueous or organic solvent, e.g. in a water borne or solvent borne coating composition, as is described in greater detail below. For example, the composition may be a dispersion, emulsion, etc., wherein the continuous phase is a solvent or liquid and the dispersed phase is a compound or particle. The polymer of this disclosure may make it possible to disperse the particle in the continuous phase.

The dispersant polymer may be described as a polymer that is added to a suspension, emulsion, dispersion, or colloid, to improve separation of particles therein to minimize settling and/or clumping. The polymer can be used in any type of composition, as is further described in detail below. In one embodiment, the polymer disclosed herein is a dispersant, typically a particulate solid dispersant.

The polymer can be alternatively described as a segmented copolymer. For example, the polymer may have segments of varying types based on the types of reactants used. These segments may be in a block orientation or in a comb orientation, as understood by those of skill in the art.

One non-limiting embodiment of a synthetic scheme to form a waterborne embodiment of the polymer of this disclosure is set forth in FIG. 1 showing an ethyleneoxy/propyleneoxy moiety for interaction with polar solvents such as water and a hydrophobic portion for pigment anchoring. In another embodiment, such as a solvent borne embodiment, the polymer includes a polar portion for pigment anchoring and a non-polar portion for interaction with a non-polar solvent. Typically, waterborne embodiments include greater amounts of ethylene oxide as compared to propylene oxide whereas solvent borne embodiments include greater amounts of propylene oxide as compared to ethylene oxide.

The polymer includes the reaction product of A, B, and C, and optionally D, which can be referred to as Reactant A, Reactant B, Reactant C, and Reactant D, respectively, below. The method of forming the polymer and the reaction of these reactants is described in greater detail below.

Reactant A:

Reactant A is a polyepoxide that is the condensation product of phenol, formaldehyde, and epichlorohydrin; the condensation product of bisphenol A, formaldehyde, and epichlorohydrin; or a combination of these condensation products. In other words, (A) may be only the condensation product of phenol, formaldehyde, and epichlorohydrin. Alternatively, (A) may be only the condensation product of bisphenol A, formaldehyde, and epichlorohydrin. Alternatively, (A) may be a combination of the condensation product of phenol, formaldehyde, and epichlorohydrin and the condensation product of bisphenol A, formaldehyde, and epichlorohydrin.

Just as above, it is contemplated that the reaction may proceed by adding any one or more of phenol, formaldehyde, and epichlorohydrin, to any one or more of phenol, formaldehyde, and epichlorohydrin, in any order and in any amount. Similarly, it is contemplated that the reaction may proceed by adding any one or more of bisphenol A, formaldehyde, and epichlorohydrin, to any one or more of bisphenol A, formaldehyde, and epichlorohydrin, in any order and in any amount. In other words, all orders of addition and reaction of phenol, formaldehyde, and epichlorohydrin, and bisphenol A, formaldehyde, and epichlorohydrin, are hereby expressly contemplated.

In one embodiment, bisphenol A is combined with formaldehyde and then epichlorohydrin is combined with the combination of bisphenol A and formaldehyde. In another embodiment, phenol is combined with formaldehyde and then epichlorohydrin is combined with the combination of phenol A and formaldehyde. The order of addition, reaction times, reaction temperatures, and reaction pressures may all be chosen by one of skill in the art.

In one embodiment, the polyepoxide has the following structure wherein n is a number, or an average, of from about 0 to about 10. In this embodiment, the polyepoxide is the condensation product of phenol and formaldehyde further reacted with epichlorohydrin to generate epoxide groups.

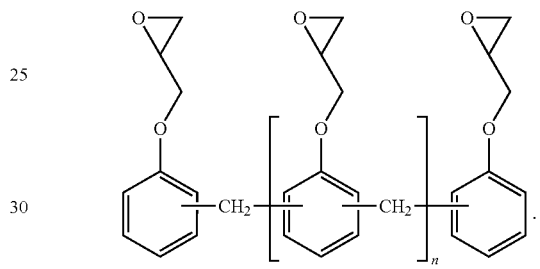

For example, as a discrete number, n can be about 0, 1, 2, 3, 4, 5, 6, 7, 8, 9, or 10. As an average number, n is greater than 0, may be less than 1, or may be as described above. In other embodiments, n, as discrete or as an average, is from about 0 to about 9, about 0 to about 8, about 0 to about 7, about 0 to about 6, about 0 to about 5, about 0 to about 4, about 0 to about 3, about 0 to about 2, or about 0 to about 1. In other embodiments, n, as discrete or as an average, is from about 0 to about 0.9, about 0 to about 0.8, about 0 to about 0.7, about 0 to about 0.6, about 0 to about 0.5, about 0 to about 0.4, about 0 to about 0.3, about 0 to about 0.2, or about 0 to about 0.1. In other embodiments, n, as discrete or as an average, is less than about 5, 4.5, 4, 3.5, 3, 2.5, 2, 1.5, or 1. In various embodiments, n, as discrete or as an average, is 0.1, 0.2, 0.3, 0.4, 0.5, 0.6, 0.7, 0.8, 0.9, 1, 1.1 . . . up to about 10. In still other embodiments, n as discrete or as an average is from about 0.1 to about 1, about 0.2 to about 0.9, about 0.3 to about 0.8, about 0.4 to about 0.7, about 0.5 to about 0.6, about 0.1 to about 2, about 0.1 to about 1.5, about 0.1 to about 0.5, about 1 to about 2, or about 1.5 to about 2. In various non-limiting embodiments, all whole and fractional values and ranges of whole and fractional values including and between each value set forth above, are hereby expressly contemplated for use herein.

In another embodiment, the polyepoxide has the following structure wherein n is a number, or an average, of from about 0 to about 5. In this embodiment, the polyepoxide is the condensation product of bisphenol A and formaldehyde further reacted with epichlorohydrin to generate epoxide groups.

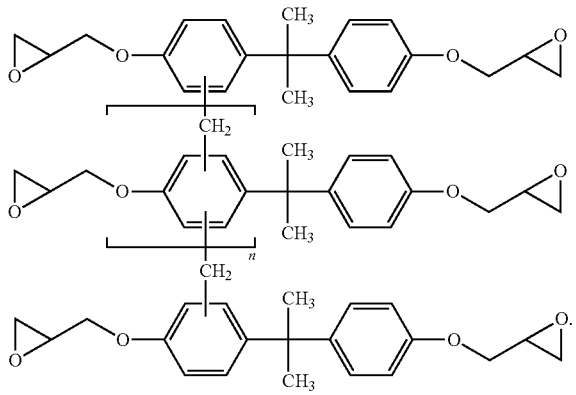

For example, as a discrete number, n can be about 0, 1, 2, 3, 4, or 5. In one embodiment, n has an average value of from greater than about 0 and up to about 5. As an average number, n is greater than 0, may be less than 1, or may be as described above. In other embodiments, n is from about 1 to about 5, about 2 to about 4, or about 3 to about 4. In other embodiments, n, as discrete or as an average, is from about 0 to about 5, about 0 to about 4, about 0 to about 3, about 0 to about 2, or about 0 to about 1. In other embodiments, n, as discrete or as an average, is from about 0 to about 0.9, about 0 to about 0.8, about 0 to about 0.7, about 0 to about 0.6, about 0 to about 0.5, about 0 to about 0.4, about 0 to about 0.3, about 0 to about 0.2, or about 0 to about 0.1. In other embodiments, n, as discrete or as an average, is less than about 5, 4.5, 4, 3.5, 3, 2.5, 2, 1.5, or 1. In various embodiments, n, as discrete or as an average, is 0.1, 0.2, 0.3, 0.4, 0.5, 0.6, 0.7, 0.8, 0.9, 1, 1.1 . . . up to about 5. In still other embodiments, n as discrete or as an average is from about 0.1 to about 1, about 0.2 to about 0.9, about 0.3 to about 0.8, about 0.4 to about 0.7, about 0.5 to about 0.6, about 0.1 to about 2, about 0.1 to about 1.5, about 0.1 to about 0.5, about 1 to about 2, or about 1.5 to about 2. In various non-limiting embodiments, all whole and fractional values and ranges of whole and fractional values including and between each value set forth above, are hereby expressly contemplated for use herein.

Reactant B:

Reactant B can be a single compound or a mixture of two or more compounds. In one embodiment, Reactant B is at least one polyoxyalkylene with a terminal primary amine group wherein each polyoxyalkylene includes an ethyleneoxy moiety and a propyleneoxy moiety and independently has the following structure:

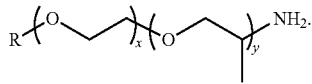

The ethyleneoxy moiety and the propyleneoxy moiety may be distributed randomly or in blocks. In this structure, the ethyleneoxy unit is indicated by subscript "x" and the propyleneoxy unit is indicated by subscript "y". In this structure, R is a hydrogen atom or a $C_1$-$C_4$ group. The $C_1$-$C_4$ group is typically an alkyl group but may be an alkenyl group or alkynyl group. The group may be linear or branched.

The values of x and y may be discrete or may be average values. Moreover, each of x and y is independently from 0 to about 500 and x+y>0. In other embodiments, each of x and y is independently from 0 to about 450 and x+y>0, or
each of x and y is independently from 0 to about 400 and x+y>0, or
each of x and y is independently from 0 to about 350 and x+y>0, or
each of x and y is independently from 0 to about 300 and x+y>0, or
each of x and y is independently from 0 to about 250 and x+y>0, or
each of x and y is independently from 0 to about 200 and x+y>0, or
each of x and y is independently from 0 to about 150 and x+y>0, or
each of x and y is independently from 0 to about 100 and x+y>0,
each of x and y is independently from 0 to about 50 and x+y>0,
each of x and y is independently from 0 to about 25 and x+y>0,
each of x and y is independently from 0 to about 20 and x+y>0,
each of x and y is independently from 0 to about 15 and x+y>0,
each of x and y is independently from 0 to about 10 and x+y>0, or
each of x and y is independently from 0 to about 5 and x+y>0.

In various non-limiting embodiments, all whole and fractional values and ranges of whole and fractional values including and between each value set forth above, are hereby expressly contemplated for use herein.

In various embodiments, each of x and y is independently of from about 0 to about 400, from about 5 to about 400, from about 5 to about 350, from about 5 to about 300, from about 5 to about 250, from about 5 to about 200, from about 5 to about 150, from about 5 to about 100, from about 5 to about 50, from about 5 to about 25, so long as x+y>0.

In other embodiments, each of x and y is independently about 0, 1, 2, 3, 4, 5, 6, 7, 8, 9, or 10, so long as x+y>0. Each of x and y can be 0 or greater than 0, may be less than 1, or may be as described above, so long as x+y>0. In other embodiments, each of x and y is from about 0 to about 25, about 0 to about 24, about 0 to about 23, about 0 to about 22, about 0 to about 21, about 0 to about 20, about 0 to about 19, about 0 to about 18, about 0 to about 17, about 0 to about 16, about 0 to about 15, about 0 to about 14, about 0 to about 13, about 0 to about 12, about 0 to about 11, or about 0 to about 10, so long as x+y>0. In other embodiments, each of x and y is from about 0 to about 9, about 0 to about 8, about 0 to about 7, about 0 to about 6, or about 0 to about 5. In various non-limiting embodiments, all whole and fractional values and ranges of whole and fractional values including and between each value set forth above, are hereby expressly contemplated for use herein.

In one embodiment, each of x and y are independently two or greater and the ethyleneoxy and propyleneoxy moieties are present in a block configuration. In another embodiment, each of x and y are independently two or greater and the ethyleneoxy and propyleneoxy moieties are present in a random configuration. It is also contemplated that x can be zero so long as x+y>0. Similarly, it is contemplated that y can be zero so long as x+y>0.

In various embodiments, the polymer can be a water borne dispersant wherein x has a value that is approximately 1.1, 1.2, 1.3, 1.4, 1.5, 1.6, 1.7, 1.8, 1.9, 2, or more times greater than a value of y. In other embodiments, the polymer can be a solvent borne dispersant wherein y has a value that is approximately 1.1, 1.2, 1.3, 1.4, 1.5, 1.6, 1.7, 1.8, 1.9, 2, or more times greater than a value of x. Typically, when the polymer is solvent borne, Reactant B has a an HLB value of 10, 9, 8, 7, 6, 5, 4, 3, 2, or 1, Alternatively, the HLB may be described as about 1 to about 10, about 2 to about 9, about 3 to about 8, about 4 to about 7, or about 5 to about 6. Typically, when the polymer is water borne, Reactant B has a an HLB value of 20, 19, 18, 17, 16, 15, 14, 13, 12, or 11, Alternatively, the HLB may be described as about 11 to about 20, about 12 to about 19, about 13 to about 18, about 14 to about 17, or about 15 to about 16. In various non-limiting embodiments, all whole and fractional values and ranges of whole and fractional values including and between each value set forth above, are hereby expressly contemplated for use herein.

Alternatively, reactant B may be described as a commercially available compound known as a Jeffamine©.

Reactant C:

Reactant C is an anchoring compound that is a secondary amine, a monocarboxylic acid, a cyclic imide, or a combination thereof. The secondary amine, monocarboxylic acid, and cyclic imide are not particularly limited and may be any known in the art. The secondary amine can be linear, branched, cyclic, or aromatic. Similarly, the monocarboxylic acid can be linear, branched, cyclic, or aromatic.

Secondary amines typically have two organic substituents (alkyl, aryl or both) bound to a nitrogen atom together with one hydrogen. In one embodiment, the secondary amine is chosen from dimethylamine, diethylamine, dipropylamine, diphenylamine, and combinations thereof.

In other embodiments, the secondary amine has the formula R'R"—NH, wherein each of R' and R" can independently be an aliphatic or aromatic group and can have from 1 to about 20 carbon atoms. Each of R' and R" can independently be saturated or unsaturated. Each of R' and R" can independently be linear, branched, cyclic, or aromatic. In various embodiments, one or both of R' and R" each independently have 1 to about 20 carbon atoms. In other embodiments, one or both of R' and R" each independently have about 8 to about 20, about 9 to about 19, about 10 to about 17, about 11 to about 16, about 12 to about 15, or about 13 to about 14, carbon atoms. In other embodiments, one or both of R' and R" each independently have about 6 carbon atoms. In other embodiments, one or both of R' and R" each independently have about 8 to about 20 carbon atoms. In various non-limiting embodiments, all whole and fractional values and ranges of whole and fractional values including and between each value set forth above, are hereby expressly contemplated for use herein.

In one embodiment, the secondary amine is chosen from pyrrolidine, piperidine, oxazolidines, morpholine, dicyclohexyl amine, and combinations thereof. In another embodiment, the secondary amine is chosen from diisopropylamine, N,N'-dimethyl-1,3-diamine, dimethyl amine, diethanolamine, and combinations thereof. In another embodiment, the secondary amine is chosen from N-benzylmethylamine, N-methylaniline, and combinations thereof.

The monocarboxylic acid may be any compound having a single carboxyl (COOH) group. In various embodiments, the monocarboxylic acid has the formula $R^1COOH$ wherein $R^1$ is a group, such as a hydrocarbyl group, having from 2 to 100 carbon atoms. In other embodiments, $R^1$ is a group having from about 2 to about 75, about 2 to about 50, about 2 to about 25, or about 2, 3, 4, 5, 6, 7, 8, 9, 10, 11, 12, 13, 14, 15, 16, 17, 18, 19, or 20. In other embodiments, $R^1$ is a group having from about 2 to about 6, about 3 to about 5, about 3 to about 4, or 2, 3, 4, 5, or 6, carbon atoms. In other embodiments, $R^1$ is a group having 6 carbon atoms. In another embodiment, the monocarboxylic acid has the formula $R^1COOH$ wherein $R^1$ is an aliphatic group having from about 8 to about 24 carbon atoms. In various non-limiting embodiments, all whole and fractional values and ranges of whole and fractional values including and between each value set forth above, are hereby expressly contemplated for use herein.

In one embodiment, the monocarboxylic acid is aromatic. In one embodiments, the monocarboxylic acid is a substituted or unsubstituted benzoic acid. In another embodiment, the monocarboxylic acid is nitrobenzoic acid, e.g. 2-, 3-, or 4-, nitrobenzoic acid. In another embodiment, the monocarboxylic acid is chosen from caprylic acid, capric acid, palmitic acid, stearic acid, isostearic acid, oleic acid, linoleic acid, behenic acid, and combinations thereof.

Referring now to the cyclic imide, a cyclic imide is an imide that has two acyl groups bound to a nitrogen in which the two carbonyl carbons are connected by a 5 carbon atom cyclic structure. The cyclic imide is not particularly limited in this disclosure and may be any known in the art. For example, the cyclic imide may be chosen from 2,3-dibromomaleimide, maleimide, α,α-dimethyl-β-methylsuccinimide, 3,4,5,6-tetrachlorophthalimide, 4,5-dichlorophthalimide, phthalimide, cis-1,2,3,6-tetrahydrophthalimide, pyromellitic diimide, 3-maleimidopropionic acid, α-methyl-α-phenylsuccinimide, 1,8-naphthalimide, and combinations thereof. In one embodiment, the cyclic imide is phthalimide.

Reactant D:

As described above, the polymer may be formed using reactant D. For example, the polymer may be formed by reacting a tertiary amine with reactant D which is an alkylating agent. In such an embodiment, the tertiary amine is itself the reaction product of reactant C (i.e., a secondary amine anchoring compound) and reactant A (the polyepoxide). This reaction would form one or more quaternary ammonium groups on the polymer. Reactant B could then also participate in this reaction as understood by those of skill in the art.

In one embodiment, the reaction is as follows wherein (A+B+C) is first reacted then followed by reaction with D, wherein the molar amounts are typically equimolar between the epoxide and the sum of the acids and amines.

Reactant D is an alkylating agent and is not particularly limited. In various embodiments, the alkylating agent may be an electrophilic alkylating agent. For example, in a Menshutkin reaction, a tertiary amine is converted into a quaternary ammonium salt by reaction with an alkyl halide. The alkyl halide may be any known in the art.

In various embodiments, reactant D is chosen from benzyl chloride, dimethyl sulfate, methyl-p-toluenesulfonate, and combinations thereof. In one embodiment, reactant D is benzyl chloride. In another embodiment, reactant D is dimethyl sulfate. In a further embodiment, reactant D is methyl-p-toluenesulfonate. In another embodiment, reactant D is chosen from dialkyl sulfates such as dimethyl sulfate, diethyl sulfate, and combinations thereof. In another embodiment, reactant D is chosen from substituted alkyl sulfonates, unsubstituted alkyl sulfonates, arylalkyl sulfonates, and combinations thereof.

Additional Embodiments

In various embodiments, the polymer may be described as having an anchoring group, e.g. formed from use of Reactant C which is the anchoring compound. In other words, the anchoring group may be described as the group in the final polymer that is formed from the anchoring compound that is utilized during synthesis of the polymer. The anchoring group on the polymer may be chosen from (1) aromatic ester groups, (2) aromatic amine groups, (3) cationic quaternary ammonium groups, (4) a cyclic imide group that may be attached to an aromatic group, or (5) any mixtures thereof. In various embodiments, the concentration of the pigment anchoring group in the polymer is at least about 1% by weight, based on the total weight of the polymer. At lower concentrations, there may not be sufficient interaction with the pigment to avoid flocculation, particularly in more polar solvents for solvent borne applications. The typical concentration is between about 2 and about 40% by weight. However, at higher concentrations, generally above 20% by weight, low polarity solvents may not be satisfactory solvents for the dispersants.

The aromatic ester anchoring groups, in particular, can be attached as pendant groups by reacting epoxy functional groups with an aromatic carboxylic acid. The aromatic carboxylic acids useful herein may be unsubstituted or may contain substituents, such as, e.g., nitro groups, hydroxy, amino, ester, acryloxy, amide, nitrile, halogen, haloalkyl, alkoxy, and the like. Typical aromatic carboxylic acids are benzoic acid, 2-nitrobenzoic acid, 3-nitrobenzoic acid, 4-nitrobenzoic acid, 3,5-dinitrobenzoic acid, 1-naphthoic acid, 3-chlorobenzoic acid, 4-biphenyl carboxylic acid, n-phthaloyl glycine, 4-sulfamido benzoic acid, and the like.

The aromatic amine anchoring groups can be added to the polymer by reacting epoxy functional groups with a secondary aromatic amine. In various embodiments, the secondary aromatic amines may be unsubstituted or may contain substituents such as, e.g., hydroxy, ester, acyloxy, amide, nitrile, halogen, haloalkyl, alkoxy, and the like. Typical secondary aromatic amines include N-benzyl methylamine, N-benzylethanolamine, N,N-dibenzylamine, 2-(2-methylaminoethyl)pyridine, 1-phenylpiperazine. 1-benzyl piperazine, 3-(3-pyridylmethylamine) propionitrile, and the like. Alternatively, the pendant aromatic amine groups may be introduced by using instead a precursor compound containing both a tertiary aromatic amine and a carboxylic acid functional group in the esterification reaction described above. Useful examples of such compounds include nicotinic acid, picolinic acid, isonicotinic acid, and the like.

The polymer of this disclosure may also include cationic quaternary ammonium groups as the pigment anchoring group. These anchoring groups can be, and typically are, attached to the polymer by contacting tertiary amine functional groups built into the backbone with an alkylation agent, as first introduced above. Total alkylation can be at least about 10, 20, 30, 40, 50, 60, 70, 80, 90% of the tertiary amine moieties. These cationic precursor units are typically converted to the quaternary state after the formation of the basic copolymer structure by bringing the cationic precursor unit into contact with conventional alkylation agents, such as aralkyl halides, alkyl halides, alkyl toluene sulfonate, or trialkyl phosphates halides or any one described above. In other embodiments, monohalides are utilized. In further embodiments, benzylchloride and/or dimethylsulfate can be used. In other embodiments, dialkyl sulfates are utilized such as dimethyl sulfate, diethyl sulfate, and combinations thereof. In various non-limiting embodiments, all whole and fractional values and ranges of whole and fractional values including and between each value set forth above, are hereby expressly contemplated for use herein.

In still other non-limiting embodiments, the pigment anchoring group may be any one or more of those described in U.S. Pat. Nos. 6,472,463; 6,495,618; 6,451,950; 5,424,364; 6,037,414; and/or 4,656,226, each of which is expressly incorporated herein by reference in its entirety in various non-limiting embodiments.

Method of Forming the Polymer:

The polymer includes the reaction product of A, B, and C, and optionally D, which can be referred to as Reactant A, Reactant B, Reactant C, and Reactant D, respectively, below. For example, the polymer is typically formed from the reaction of A, B, and C and optionally D. It is contemplated that the reaction may proceed by adding any one or more of A, B, C, and D, to any one or more of A, B, C, and/or D in any order and in any amount, as understood by those of skill in the art. In other words, all orders of addition and reaction of A, B, C, and D are hereby expressly contemplated. In one embodiment, A, B, and C are all combined together at the same time.

In one embodiment, A is combined with B and then C is combined with the combination of A and B. Alternatively, A and C are combined and then B is combined with the combination of A and C. Alternatively, B and C are combined and then A is combined with the combination of B and C.

D is expressly contemplated to be optional. Accordingly, D may be used or the polymer may be free from any reaction with D. If D is used, it may be included in any of the reaction combinations above or may be used separately. Typically, A, B, and C are first combined and reacted and then D is utilized. In various embodiments, the polymer has one or more quaternary ammonium groups that are the result of reacting a tertiary amine with D the alkylating agent wherein the tertiary amine is itself the reaction product of C the secondary amine anchoring compound and A the polyepoxide, as described in greater detail below.

The polymer may be, include, consist essentially of, or consist of, the reaction product of A, B, and C. Alternatively, the polymer may be, include, consist essentially of, or consist of, the reaction product of A, B, C, and D. Alternatively, The polymer may be, include, consist essentially of, or consist of, the reaction product of A, B, and C, to the exclusion of D.

The polymer may be formed by any method known in the art involving the reaction product of A, B, and C, and optionally D. The order of addition, reaction times, reaction temperatures, and reaction pressures may all be chosen by one of skill in the art. In various embodiments, the reaction conditions are as follows: Reaction Time: about 1 to about 8, about 2 to about 7, about 3 to about 6, about 4 to about 5, about 2 to about 6, or about 2 to about 4, hours.

Reaction Temperature: about 70° C. to about 200° C., about 80° C. to about 180° C., or about 100° C. to about 150° C.

Reaction Pressure: typically atmospheric or less than atmospheric pressure.

In various non-limiting embodiments, all whole and fractional values and ranges of whole and fractional values including and between each value set forth above, are hereby expressly contemplated for use herein.

Typical solvents that can be used to form the polymer include alcohols, such as methanol, ethanol, n-propanol, and isopropanol; ketones, such as acetone, butanone, pentanone, hexanone, and methyl ethyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof.

In various embodiments, the reaction of A, B, and C is further defined as a reaction wherein (moles of A reacted) is approximately equal to [(moles of C reacted)+2×(moles of B reacted)), each independently plus or minus about 20, 15, 10, or 5, mole %. Typically, if too many epoxide groups are utilized in the polymer, then the polymer is unstable and is not a suitable dispersant and would not be effective. If too many groups associated with B and/or C are utilized, then the cost for production increases. However, performance may or may not increase/decrease when excess amounts of B and C are used. In various non-limiting embodiments, all whole and fractional values and ranges of whole and fractional values including and between each value set forth above, are hereby expressly contemplated for use herein.

Composition:

This disclosure also provides a composition that includes the aforementioned polymer. The amount of polymer in the composition is not particularly limited. However, in various embodiments, the polymer is present in an amount of from about 0.01 to about 50, about 0.25 to about 50, about 0.5 to about 50, about 0.25 to about 35, about 0.5 to about 30, about 5 to about 30, about 5 to about 25, about 5 to about 20, about 5 to about 15, about 5 to about 10, about 10 to about 20, about 10 to about 15, about 15 to about 20, about 15 to about 30, about 15 to about 25, or about 15, weight percent based on a total weight of the composition. In various embodiments, the polymer is present in an amount of from about 0.01 to about 5, about 0.05 to about 5, about 0.1 to about 5, about 1 to about 5, about 0.01 to about 0.1, about 0.02 to about 0.09, about 0.03 to about 0.08, about 0.04 to about 0.07, about 0.05 to about 0.06, about 0.1 to about 1, about 0.2 to about 0.9, about 0.3 to about 0.8, about 0.4 to about 0.7, about 0.5 to about 0.6, about 1.1 to about 3, about 1.2 to about 2.9, about 1.3 to about 2.8, about 1.4 to about 2.7, about 1.5 to about 2.6, about 1.6 to about 2.5, about 1.7 to about 2.4, about 1.8 to about 2.3, about 1.9 to about 2.2, about 2.0 to about 2.1, weight percent based on a total weight of the composition. Notably, this weight basis can be either a solid weight basis (e.g. without solvent) or a liquid weight basis, e.g. when the composition includes a solvent. In some embodiments, the weight can be up to about 55, about 60, about 65 or about 70, weight percent based on solid weight basis. In various non-limiting embodiments, all whole and fractional values and ranges of whole and fractional values including and between each value set forth above, are hereby expressly contemplated for use herein.

The composition may also include a compound in addition to the polymer. This compound may be a particulate solid or may be a liquid, such as an oil. In various embodiments, the particulate solid may be any inorganic or organic solid material which is substantially insoluble in a solvent. In one embodiment, the particulate solid is a pigment or filler.

In one embodiment, the particulate solid is an organic pigment from any of the recognized classes of pigments described, for example, in the Third Edition of the Colour Index (1971) and subsequent revisions of, and supplements thereto, under the chapter headed "Pigments". Carbon black, although strictly inorganic, behaves more like an organic pigment in its dispersing properties. Non-limiting examples of suitable particulate solids are pigments for solvent inks; pigments, extenders and fillers for paints and plastics materials; disperse dyes; optical brightening agents, and combinations thereof. In various embodiments, suitable inorganic solids include extenders and fillers such as talc, kaolin, silica, barytes and chalk, flame-retardant fillers such as alumina trihydrate, or magnesium hydroxide; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

In one embodiment, the pigment may be a phthalocyanine, or mixtures thereof. The phthalocyanine may for instance include phthalocyanine green pigment, phthalocyanaine blue pigment, etc. In other embodiments, the pigment is carbon black. In another embodiment, the pigment is an anti-corrosive pigment. In other embodiments, suitable inorganic pigments include, for example, titanium dioxide, iron oxides of various colors, zinc oxide, carbon black, talc, china clay, barytes, carbonates, silicates and combinations thereof. In further embodiments, suitable organic pigments include, for example, quinacridones, phthalocyanines, perylenes, azo pigments, indanthrones, carbazoles, isoindolinones, isoindolones, thioindigio reds, and benzimidazolinones; and metallic flakes such as aluminum flake, pearlescent flakes, and combinations thereof.

The solvent may be or include water, an aqueous solvent, or an organic solvent. In one embodiment, the solvent may be a combination of water and water miscible solvents. The aqueous solvent may be described as any polar solvent known in the art. For example, the polar solvent may be an alcohol such as ethanol or methanol, butanol, isobutanol, acetone, methyl ethyl ketone, isopropanol, n-propanol, acetonitrile, DMSO (dimethyl sulfoxide), DMF (dimethyl formamide), ether alcohols, butyl cellosolve, dipropyleneglycol monomethylether, or combinations thereof.

In other embodiments, the solvent may be or include a polar organic liquid such as an ether, especially lower alkyl ethers, ester, ketone, glycol, alcohol, amide, or combinations thereof. In one embodiment, polar organic liquids include dialkyl ketones, alkyl esters of alkane carboxylic acids and alkanols, especially such liquids including up to, and including, a total of 6 or 8 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alcohols such as methanol, ethanol, n-propanol, isopropanol, n-butanol and isobutanol and dialkyl and cyclic ethers such as diethyl ether and tetrahydrofuran. In one embodiment, solvents are alcohols, and esters of alkane carboxylic acids. The polar organic liquid may include methanol, ethanol, n-propanol, isopropanol, n-butanol and isobutanol, or mixtures thereof. In one embodiment, the solvent is water.

Examples of organic liquids, which may be used as polar organic liquids are film-forming resins such as inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol oxyalkylene.

In one embodiment, non-polar organic liquids are compounds including aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons including six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

The organic liquid may be chosen such that it reacts via UV cure. For example, the organic liquid may be an acrylate containing liquid.

In one embodiment, the organic liquid includes at least 0.1% by weight, or 1% by weight or more of a polar organic liquid based on the total organic liquid. The organic liquid optionally further includes water. In one embodiment, the organic liquid is free of water. When the organic liquid includes water, the amount of water present in various embodiments is not greater than 10%, or not greater than 5%, or not greater than 1% by weight based on the total amount of organic liquid plus water. In other words, compositions that include more than about 10 wt. % of water are not typically considered to be solvent borne. In various non-limiting embodiments, all whole and fractional values and ranges of whole and fractional values including and between each value set forth above, are hereby expressly contemplated for use herein.

In various embodiments, the composition includes water present in an amount of at least about 10, 15, 20, 25, 30, 35, 40, 45, 50, 55, 60, 65, or 70 weight percent based on a total weight of the composition. In another embodiment, the composition includes a non-aqueous solvent in an amount of at least 10, 15, 20, 25, 30, 35, 40, 45, 50, 55, 60, 65, or 70 weight percent based on a total weight of the composition. In various non-limiting embodiments, all whole and fractional values and ranges of whole and fractional values including and between each value set forth above, are hereby expressly contemplated for use herein.

If desired, the compositions may include other ingredients, for example, resins binders, fluidizing agents, anti-sedimentation agents, plasticizers, surfactants, anti-foam agents, rheology modifiers, levelling agents, gloss modifiers, preservatives, pH adjustors such as organic amines, biocides, and the like, and combinations thereof.

In various embodiments, the composition typically includes from about 1 to about 95% by weight of the compound, e.g. the particulate solid, the precise quantity depending on the nature of the compound and the relative densities of the compound and a solvent. For example, a composition in which the compound is a particulate solid such as an organic material or organic pigment, in one embodiment includes from about 1 to about 60, about 5 to about 55, about 10 to about 50, about 15 to about 45, about 20 to about 40, about 25 to about 35, or about 35 to about 30, percent by weight of the particulate solid whereas a composition in which the particulate solid is an inorganic material, such as an inorganic pigment, filler or extender and in another embodiment includes from about 20 to about 90, about 25 to about 85, about 30 to about 80, about 35 to about 75, about 40 to about 70, about 45 to about 65, about 50 to about 60, or about 55 to about 60, % by weight of the particulate solid based on the total weight of composition. In various embodiments, the composition includes the compound in an amount of from about 4 to about 16, about 6 to about 14, about 8 to about 12, or about 10 to about 12, % by weight of the particulate solid based on the total weight of composition. In various embodiments, the composition includes the compound in an amount of from about 1 to about 95, about 10 to about 90, about 15 to about 85, about 20 to about 80, about 25 to about 75, about 30 to about 70, about 35 to about 65, about 40 to about 60, about 45 to about 55, or about 50, % by weight based on a total weight of the composition. In various non-limiting embodiments, all whole and fractional values and ranges of whole and fractional values including and between each value set forth above, are hereby expressly contemplated for use herein.

The composition may be described as a coating composition, which may be any type known in the art. For example, the composition may be further defined as a paint or ink including the compound such as the particulate solid, an organic liquid, a binder and the polymer disclosed herein.

Method of Forming the Composition:

The composition may be prepared by any of the conventional methods known in the art. For example, the compound such as the particulate solid, any solvent, and the polymer may be combined in any order and then be subjected to a mechanical treatment to reduce the particles of the particulate solid to an appropriate size, for example, by ball milling, 2-roll or 3-roll milling, bead milling, gravel milling or plastic milling until the dispersion is formed. Alternatively, the compound such as the particulate solid may be treated to reduce its particle size independently or in admixture with either the solvent or the polymer and/or the other ingredient or ingredients then being added and the mixture being agitated to provide the composition.

In one embodiment, the composition is a liquid dispersion. The dispersion may be a nano-dispersion (typically with a mean particle size of 100 nm or less), or a micro-dispersion (typically with a mean particle size of greater than 100 nm to 3 microns). In one embodiment, such dispersion compositions include: (a) 0.5 to 70 parts of a particulate solid, (b) 0.5 to 40 parts of the polymer, and (c) 30 to 99 parts of the aforementioned solvent; wherein all parts are by weight and the amounts (a)+(b)+(c)=100. In one embodiment, component a) includes 0.5 to 70 parts of a pigment and such dispersions are useful as liquid inks, paints and mill-bases. In one embodiment, component a) includes 0.5 to 40 parts of a pigment and such dispersions are useful as liquid inks. If a composition is required including a particulate solid and a polymer disclosed herein in dry form, the solvent is typically volatile so that it may be readily removed from the particulate solid by a simple separation means such as evaporation. In various non-limiting embodiments, all whole and fractional values and ranges of whole and fractional values including and between each value set forth above, are hereby expressly contemplated for use herein.

If a dry composition includes the polymer disclosed herein and the particulate solid, it typically includes at least 0.2%, at least 0.5% or at least 1.0% of the polymer based on weight of the particulate solid. In one embodiment, the dry composition includes not greater than 99.9%, not greater than 50%, not greater than 20%, or not greater than 10% by weight of the polymer disclosed herein based on the weight of the particulate solid. In one embodiment, the polymer disclosed herein is present at 0.6 wt. % to 8 wt. %. In various non-limiting embodiments, all whole and fractional values and ranges of whole and fractional values including and between each value set forth above, are hereby expressly contemplated for use herein.

Dispersion:

This disclosure also provides a dispersion that includes water and/or a non-polar solvent, a color pigment, and the aforementioned polymer. The dispersion may be waterborne or solvent borne, as understood by those of skill in the art. For example, even in water borne compositions, a small amount of a non-polar solvent may be included. Similarly, in a solvent borne composition, a small amount of water and/or a polar solvent may be included. Accordingly, it is contemplated that the terminology waterborne and solvent borne may be strictly interpreted or may be more loosely interpreted to allow for small amounts of other solvents, in various non-limiting embodiments.

It is also contemplated that the color pigment, i.e., a pigment that provides color, may be any described herein or known in the art. This pigment may be combined with any other additives or pigments described herein or known in the art. Alternatively, this color pigment may be substituted for any pigment or additive described herein or known in the art, in various non-limiting embodiments.

In one embodiment, the dispersion is solvent borne and includes the non-polar solvent. In this embodiment, (A) has the structure as follows wherein n is an average of about 2.4:

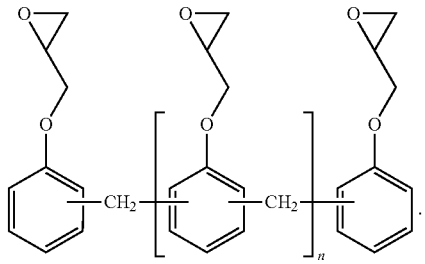

Moreover, (B) includes a compound that has the structure as follows wherein R is methyl, x is about 6, and y is 29:

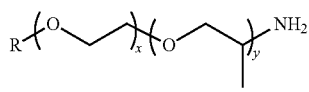

and (C) is n-benzylmethyl amine and/or p-nitro benzoic acid.

(D) is optional and may be, for example, methyl-p-toluene sulfonate.

In another embodiment, the dispersion is waterborne and includes water. In this embodiment, (A) has the structure as follows wherein n is an average of about 1.5:

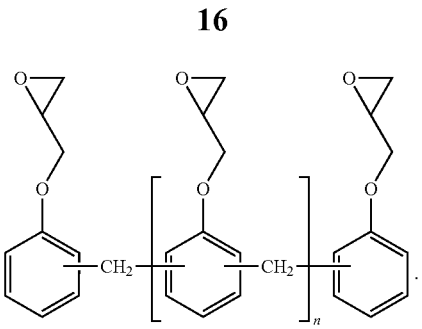

Moreover, (B) has the structure as follows wherein R is methyl, x is about 33, and y is about 10:

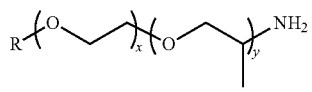

(C) is n-benzylmethyl amine and/or p-nitro benzoic acid.

(D) is optional and may be, for example, methyl-p-toluene sulfonate.

In another embodiment, the dispersion is waterborne and includes water. In this embodiment, (A) has the structure as follows wherein n is an average of about 0.5:

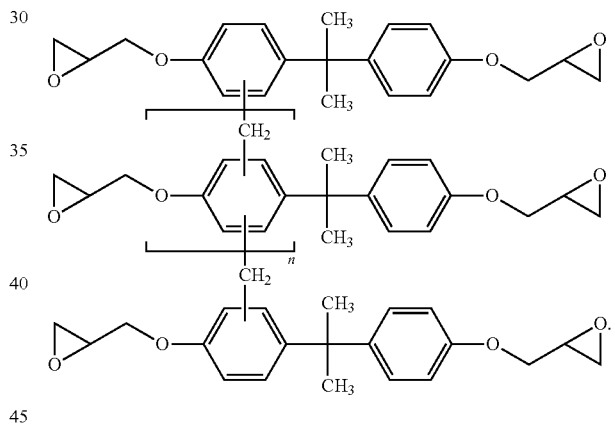

Moreover, (B) includes a compound that has the structure as follows wherein R is methyl, x is about 33 to about 58, and y is about 8 to about 10:

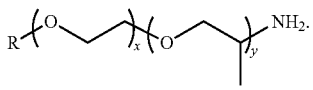

In addition, (B) further includes a compound that has the structure as follows wherein R is methyl, x is about 6, and y is about 29:

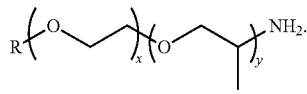

Moreover, (C) is n-benzylmethyl amine and/or p-nitro benzoic acid.

(D) is optional and may be, for example, methyl-p-toluene sulfonate.

In another embodiment, the dispersion is waterborne and includes water. In this embodiment, (A) has the structure as follows wherein n is an average of about 2.4:

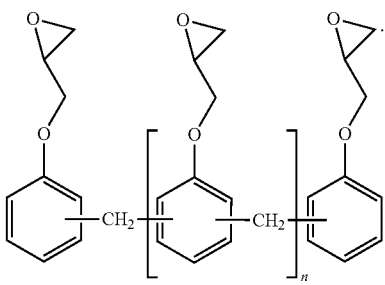

Moreover, (B) is a compound that has the structure as follows wherein R is methyl, x is about 33, and y is about 10:

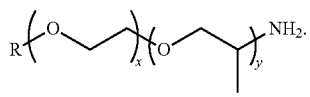

In addition, (C) is n-benzylmethyl amine and/or p-nitro benzoic acid and (D) is methyl-p-toluene sulfonate.

The amount of polymer in the dispersion is not particularly limited. However, in various embodiments, the polymer is present in an amount of from about 0.01 to about 50, about 0.25 to about 50, about 0.5 to about 50, about 0.25 to about 35, about 0.5 to about 30, about 5 to about 30, about 5 to about 25, about 5 to about 20, about 5 to about 15, about 5 to about 10, about 10 to about 20, about 10 to about 15, about 15 to about 20, about 15 to about 30, about 15 to about 25, or about 15, weight percent based on a total weight of the dispersion. Notably, this weight basis can be either a solid weight basis (e.g. without solvent) or a liquid weight basis. In various non-limiting embodiments, all whole and fractional values and ranges of whole and fractional values including and between each value set forth above, are hereby expressly contemplated for use herein.

In various embodiments, the dispersion includes water or the non-polar solvent in an amount of at least about 10, 15, 20, 25, 30, 35, 40, 45, 50, 55, 60, 65, or 70 weight percent based on a total weight of the composition. In various non-limiting embodiments, all whole and fractional values and ranges of whole and fractional values including and between each value set forth above, are hereby expressly contemplated for use herein.

In various embodiments, the dispersion includes the color pigment in an amount of from about 2 to about 95, about 10 to about 90, about 15 to about 85, about 20 to about 80, about 25 to about 75, about 30 to about 70, about 35 to about 65, about 40 to about 60, about 45 to about 55, or about 50, % by weight based on a total weight of the dispersion.

The instant dispersion may include one or more additives or pigments as described above in one or more amounts as described above.

EXAMPLES

Examples 1-5 below describe preparation of various polymers of this disclosure. Examples 6 and 7 provide an evaluation of various polymers in solvent borne dispersions and water borne dispersions.

Example 1

Preparation of PNE177(p-NBA)//Jeffamine M-2005 Polymer, 17.41(3.30)//79.29% by Weight PNE177 has the structure as set forth below wherein n is an average of about 2.4:

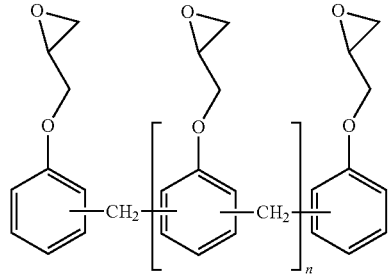

Jeffamine M-2005 Polymer has the structure as set forth below wherein R is methyl, x is 6, and y is 29:

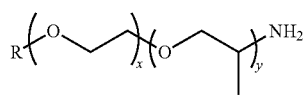

Example 1 describes the preparation of a polymer of this disclosure with hydrophobic, solvent soluble polyether groups on one segment and hydrophobic, but relatively more polar, aromatic groups, and nitrobenzoate groups on the second segment that can be utilized to disperse and stabilize pigments in a solvent borne coating composition. A 2-liter flask was equipped with a thermometer, stirrer, additional funnel, heating mantel, reflux condenser and a means of maintaining a nitrogen blanket over the reactants. The flask was held under nitrogen positive pressure and the following ingredients were employed (Table 1).

TABLE 1

| | Weight (gram) |
|---|---|
| Portion 1 | |
| Jeffamine M-2005 (Huntsman, Mcintosh, AL) (Reactant B) - | 200 |
| PNE177 (80% solution in xylene, Chang Chun Plastics Co., Ltd., Taiwan) (Reactant A) | 54.88 |
| p-nitro benzoic acid (p-NBA) (Reactant C) | 8.33 |
| Butyl acetate | 150 |
| Portion 2 | |
| Trimethyl benzyl ammonium hydroxide (40% solution in methanol, Aldrich) | 3.03 |
| Total | 416.24 |

Portion 1 mixture was charged to the flask. The mixture was heated with agitation under the nitrogen blanket until the ingredients were completely dissolved. The Portion 2 was added through the additional funnel. The reaction mixture was heated to reflux and held at reflux temperature for 3 hours. The finished product was cooled and filled out.

The resulting polymer solution was a light yellow clear polymer solution and had a solid content of about 63.81% and a Gardner-Holtz viscosity of F+1/2. The polymer had a 26,184 Mw and an 8,080 Mn based on gel permeation chromatography using polymethylmethacrylate as standard.

Example 2

Preparation of PNE176(p-NBA)//Jeffamine M-2070 Polymer, 20.39(7.31)//72.29% by Weight PNE176 has the structure as set forth below wherein n is an average of about 1.5:

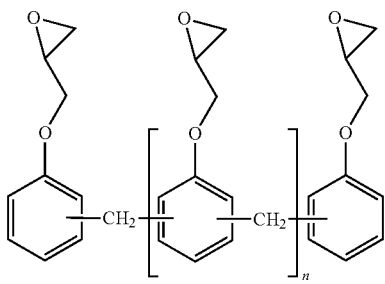

Jeffamine M-2070 Polymer has the structure as set forth below wherein R is methyl, x is 33, and y is 10:

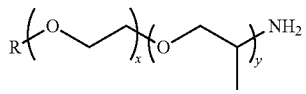

Example 2 describes the preparation of a polymer of this disclosure with hydrophilic non-ionic groups on one segment and hydrophobic aromatic groups, and nitrobenzoate groups on the second segment that can be utilized to disperse and stabilize pigments in a water borne coating composition. The Portion 1 mixture was heated with agitation until all ingredients were completely dissolved. Portion 2 and 3 were added through the additional funnel in order with agitation. The mixture was heated around 120C for 3 hours. The finished product was cooled and filled out.

TABLE 2

|  | Weight (gram) |
| --- | --- |
| Portion 1 | |
| Jeffamine M-2070 (Huntsman, Mcintosh, AL) (Reactant B) | 100 |
| PNE176 (80% solution in xylene, Chang Chun Plastics Co., Ltd., Taiwan) (Reactant A) | 28.21 |
| p-nitro benzoic acid (p-NBA) (Reactant C) | 10.12 |
| Propylene glycol monomethyl ether (Dowanol DPM, Dow Chemical) | 60 |
| Portion 2 | |
| n-Butyl alcohol | 15 |

TABLE 2-continued

|  | Weight (gram) |
| --- | --- |
| Portion 3 | |
| Trimethyl benzyl ammonium hydroxide (40% solution in methanol, Aldrich) | 1.33 |
| Total | 214.66 |

The resulting polymer solution was a light yellow slightly polymer solution and had a solid content of about 64.41% and a Gardner-Holtz viscosity of 0+2/3. The polymer had a 28,117 Mw and a 11,665 Mn based on gel permeation chromatography using polymethylmethacrylate as standard.

Example 3

Preparation of PNE176(BzA)//Jeffamine M-2070 Polymer, 17.08(2.38)//80.54% by weight PNE176 has the structure as set forth below wherein n is an average of about 1.5:

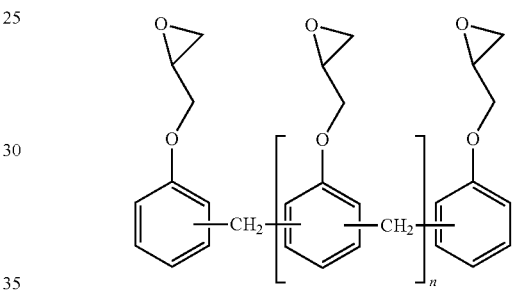

Jeffamine M-2070 Polymer has the structure as set forth below wherein R is methyl, x is 33, and y is 10:

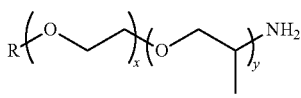

Example 3 describes the preparation of a polymer of this disclosure similar to the polymer described in Example 2 but with a different composition. This polymer has hydrophilic non-ionic groups on one segment and hydrophobic aromatic groups, and amine groups on the second segment that can be utilized to disperse and stabilize pigments in a water borne coating composition. The resin solution was prepared using the same procedure described in Example 1 with ingredients listed in Table 3.

TABLE 3

|  | Weight (gram) |
| --- | --- |
| Portion 1 | |
| Jeffamine M-2070 (Huntsman, Mcintosh, AL) (Reactant B) | 200 |
| PNE176 (80% solution in xylene, Chang Chun Plastics Co., Ltd., Taiwan) (Reactant A) | 42.42 |
| N-Benzylmethyl amine (BzA) (Reactant C) | 5.91 |
| Propylene glycol monomethyl ether (Dowanol DPM, Dow Chemical) | 60 |

TABLE 3-continued

| | Weight (gram) |
|---|---|
| Portion 2 | |
| n-Butyl alcohol | 50 |
| Portion 3 | |
| Trimethyl benzyl ammonium hydroxide (40% solution in methanol, Aldrich) | 1.99 |
| Total | 360.32 |

The resulting polymer solution was a light yellow polymer solution and had a solid content of about 70.15% and a Gardner-Holtz viscosity of L+1/2. The polymer had a 14,727 Mw and a 8,650 Mn based on gel permeation chromatography using polymethylmethacrylate as standard.

Example 4

Preparation of BNE200(p-NBA)//Jeffamine M-2005/Jeffamine M-3085 Polymer, 18.47(2.78)//11.39/66.46% by weight BNE200 has the structure as set forth below wherein n is an average of about 0.5:

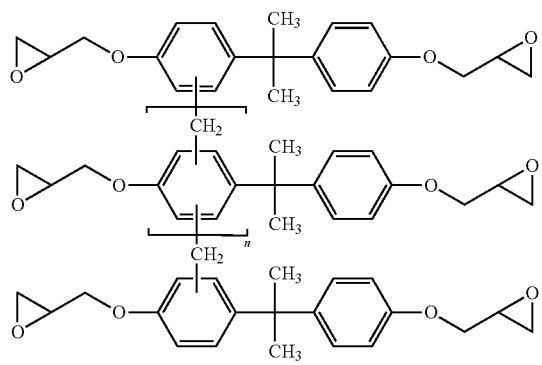

Jeffamine M-3085 Polymer has the structure as set forth below wherein R is methyl, x is 58, and y is 8:

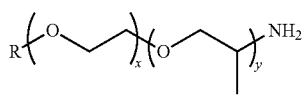

Jeffamine M-2005 Polymer has the structure as set forth below wherein R is methyl,

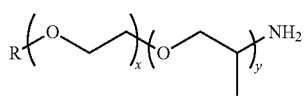

Example 4 describes the preparation of a polymer of this disclosure similar to the polymer described in Example 2 except that a mixture of Jeffamines were used. The resin solution was prepared using the same procedure described in Example 2 with ingredients listed in Table 4 in a 1-liter flask.

TABLE 4

| | Weight (gram) |
|---|---|
| Portion 1 | |
| Jeffamine M-2005 (Huntsman, Mcintosh, AL) (Reactant B) | 17.14 |
| Jeffamine M-3085 (Huntsman, Mcintosh, AL) (Reactant B) | 100 |
| p-Nitrobenzoic acid (p-NBA) (Reactant C) | 7.60 |
| Propylene glycol monomethyl ether (Dowanol DPM, Dow Chemical) | 45 |
| Portion 2 | |
| BNE200 (pellet, Chang Chun Plastics Co., Ltd., Taiwan) (Reactant A) | 25.71 |
| n-Butyl alcohol | 60 |
| Portion 3 | |
| Trimethyl benzyl ammonium hydroxide (40% solution in methanol, Aldrich) | 1.61 |
| Total | 257.06 |

The resulting polymer solution was a light yellow slightly clear polymer solution and had a solid content of about % and a Gardner-Holtz viscosity of The polymer had a 88,504 Mw and a 12,796 Mn based on gel permeation chromatography using polymethylmethacrylate as standard.

Example 5

Preparation of PNE177(BzA/MTS)//Jeffamine M-2070 Polymer, 16.59(2.06/3.16)//78.20% by Weight PNE177 has the structure as set forth below wherein n is an average of about 2.4:

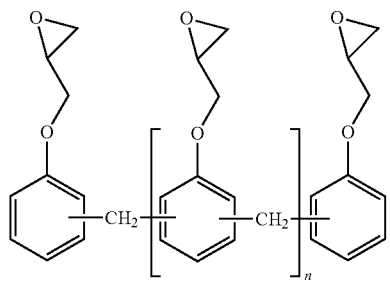

Jeffamine M-2070 Polymer has the structure as set forth below wherein R is methyl, x is 33, and y is 10:

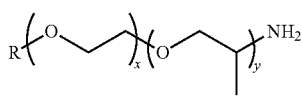

Example 5 describes the preparation of a polymer of this disclosure similar to the polymer described in Example 3 except that there are additional quaternary ammonium groups to interact with pigment surfaces. The resin solution was prepared using the same procedure described in Example 1 with ingredients listed in Table 5 in a 2-liter flask. The polymer was further reacted with portion 4 at reflux for 2 hours.

TABLE 5

| | Weight (gram) |
|---|---|
| Portion 1 | |
| Jeffamine M-2070 (Huntsman, Mcintosh, AL) (Reactant B) | 200 |
| N-Benzylmethyl amine (BzA) (Reactant C) | 5.26 |
| Propylene glycol monomethyl ether (Dowanol DPM, Dow Chemical) | 60 |
| n-Butyl alcohol | 50 |
| Portion 2 | |
| PNE177 (80% solution in xylene, Chang Chun Plastics Co., Ltd., Taiwan) (Reactant A) | 53.03 |
| n-Butyl alcohol | 15 |
| Portion 3 | |
| Trimethyl benzyl ammonium hydroxide (40% solution in methanol, Aldrich) | 1.54 |
| n-Butyl alcohol | 15 |
| Portion 4 | |
| Methyl-p-toluene sulfonate (MTS) (Reactant D) | 8.08 |
| n-butyl alcohol | 15.00 |
| Total | 422.91 |

The resulting polymer solution was a light yellow clear polymer solution and had a solid content of about 62.76 00 and a Gardner-Holtz viscosity of about L+1/4. The polymer had a 23,278 Mw and a 5,253 Mn based on gel permeation chromatography using polymethylmethacrylate as standard.

Example 6

Evaluation of Pigment Dispersant in Solvent Borne Dispersions

The following procedure was utilized to prepare the dispersion samples. To a 2 oz. glass bottle, 15 gm of sand, 20 gm of butyl acetate, 2 gm of pigment and 1 gm of the polymer of Example 1 were added. The bottle was sealed and agitated on a Red Devil plant shaker for 15 minutes. One drop of the dispersion was placed on a glass plate and protected by a cover glass. The dispersion was observed under the microscope.

The dispersant effectiveness was determined by sand-grinding a mixture of pigment, solvent, and dispersant, and observing the dispersion quality under an Olympus microscope, 40×. The well dispersed system would have a uniform appearance and the pigment particles would show vigorous Brownian motion. In contrast, the flocculated systems would have islands of flocculated pigment chunks interspersed with areas of relatively clear solvent.

TABLE 6

| Pigment Type | Rating of Polymer of Example 1 |
|---|---|
| 1 | 0 |
| 2 | 0 |
| 3 | 3 |
| 4 | 3 |
| 5 | 0 |
| 6 | 3 |
| 7 | 3 |
| 8 | 0 |
| 9 | 0 |
| 10 | 2 |
| 11 | 0 |
| 12 | 0 |

Ratings:
0: Deflocculated or dispersed
1: Very slightly flocculated
2: Slightly flocculated
3: Flocculated
Pigment Type:
1. Sudafast blue2774 by Sudarshan Chemical Industries Ltd.
2. Polomar blue 15:1 248-4816 by Sun Chemical Corp
3. Parcyaninie green P-6100 by Parshwnath Dye Chemical India Ltd.
4. Irgazin yellow L2040 by BASF Corp.
5. Novoperm orange HL-70 by Clariant Corp.
6. Irgazin Rubine L4030 by BASF Corp.
7. Cinilex DPP red SR1C by Cinic Chemicals LLC.
8. Cinquasia magenta L4540 by BASF Corp.
9. Sicopal yellow L1130 by BASF Corp.
10. Hostaperm red E4G by Clariant Corp.
11. Sudaperm yellow 2935P by Sudarshan Chemical Industries Ltd.
12. Carbon black FW-255 by Orion Engineered Carbons.

Based on these test results, the polymer of Example 1 exhibited excellent performance for certain types of pigments and over a wide range of pigment chemistries in solvent borne systems.

Example 7

Evaluation of the Pigment Dispersants in Water Borne Dispersions

The dispersion samples were prepared using the same procedure as described in Example 6 except deionized water was used as the liquid carrier. The dispersant effectiveness was also determined in the same manner as in Example 6 except that deionized water was used as the liquid carrier. The dispersions were prepared with the same set of pigments and evaluated using the procedure described in Example 6.

TABLE 7

| Pigment Type | Rating of Polymer of Example 2 | Rating of Polymer of Example 3 | Rating of Polymer of Example 4 | Rating of Polymer of Example 5 |
|---|---|---|---|---|
| 1 | NA | NA | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | NA | NA | 0 | 0 |
| 7 | 0 | 3 | 1 | 0 |
| 8 | 3 | 0 | 0 | 0 |
| 9 | 0 | 0 | 0 | 0 |
| 10 | NA | NA | 3 | 3 |
| 11 | NA | NA | 3 | 3 |
| 12 | NA | NA | 3 | 3 |
| 13 | 0 | 0 | NA | NA |
| 14 | NA | 0 | NA | NA |
| 15 | 0 | NA | NA | NA |

Ratings:
0: Deflocculated or dispersed
1: Very slightly flocculated
2: Slightly flocculated
3: Flocculated
Pigment Type:
1. Heliogen blue EH6953 by BASF Corp.
2. Heliogen blue L6950 by BASF Corp
3. Hostaperm violet RL SPEC by Clariant Corp.
4. Monolite blue 3RXH by Heucotech Ltd.

5. Parcyaninie green P-6100 by Parshwnath Dye Chemical India Ltd.
6. Irgazin rubine L4025 by BASF Corp.
7. Sudaperm yellow 2935P by Sudarshan Chemical Industries Ltd.
8. Cinquasia violet L5110 by BASF Corp.
9. Irgazin yellow L2040 by BASF Corp.
10. Raven 5000 Ultra II carbon black by Birla Carbon.
11. FW-255 carbon black by Orion Engineered Carbons.
12. FW-310 carbon black by Orion Engineered Carbons.
13. Palomar blue 248-4828 by Sun Chemical Corp.
14. Sicopal yellow L1130 by BASF Corp
15. Perrindo maroon 179 by Sun Chemical Corp.

Based on these test results, the polymers of Examples 2-5 exhibited excellent performance for certain types of pigments and over a wide range of pigment chemistries in water borne systems.

It is contemplated that, in various non-limiting embodiments, all combinations of the aforementioned chemistries, ranges, components, method steps, etc. are hereby expressly contemplated for use with one or more of each other even if those combinations are not expressly described in relation to one another or in the same sentence, paragraph, or section above. Moreover, in various non-limiting embodiments, it is contemplated that any one or more of the aforementioned values may be defined as "about" that value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A polymer that comprises the reaction product of A, B, and C and optionally D wherein:

A is a polyepoxide that is:
the condensation product of phenol, formaldehyde, and epichlorohydrin;
the condensation product of bisphenol A, formaldehyde, and epichlorohydrin; or
a combination of said condensation products;

B is at least one polyoxyalkylene with a terminal primary amine group wherein each polyoxyalkylene comprises an ethyleneoxy moiety and a propyleneoxy moiety and independently has the following structure:

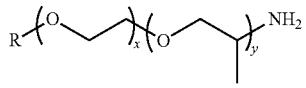

wherein R is a hydrogen atom or a $C_1$-$C_4$ group, and wherein each of x and y is independently from 0 to about 500 and x+y>0; and C is an anchoring compound that is:
a secondary amine;
a monocarboxylic acid that is aromatic;
a cyclic imide; or
a combination thereof; and D is an alkylating agent,
wherein the reaction product of A, B, and C is further defined as a reaction product wherein moles of epoxide group on A that is reacted is approximately equal to moles of C reacted +2×moles of B reacted, plus or minus about 5 mole%.

2. The polymer of claim 1 wherein the polyepoxide has the following structure:

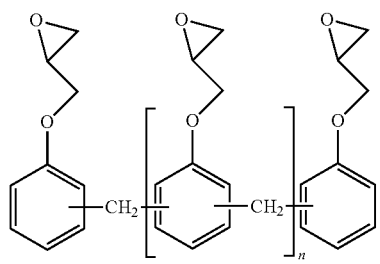

wherein n has an average value of from about 0 to about 10.

3. The polymer of claim 1 wherein the polyepoxide has the following structure:

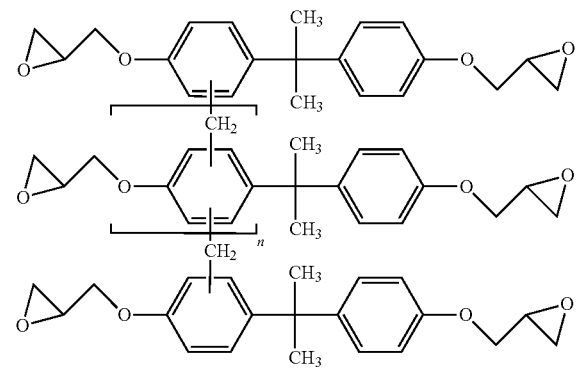

wherein n has an average value of from greater than about 0 and up to about 5.

4. The polymer of claim 1 wherein each of x and y is independently from 0 to about 25 and x+y>0.

5. The polymer of claim 1 wherein each of x and y are independently one or greater and the ethyleneoxy and propyleneoxy moieties are present in a block configuration.

6. The polymer of claim 1 wherein each of x and y are independently one or greater and the ethyleneoxy and propyleneoxy moieties are present in a random configuration.

7. The polymer of claim 1 wherein the secondary amine is chosen from N-benzylmethylamine, N-methylaniline, and combinations thereof.

8. The polymer of claim 1 wherein the monocarboxylic acid is 4-nitrobenzoic acid.

9. The polymer of claim 1 wherein the monocarboxylic acid has the formula $R^1COOH$ wherein $R^1$ is an aromatic group that has from 6 to 20 carbon atoms.

10. The polymer of claim 1 wherein the monocarboxylic acid has the formula $R^1COOH$ wherein $R^1$ is an aromatic group having about 6 carbon atoms.

11. The polymer of claim 1 formed using the alkylating agent D and comprising one or more quaternary ammonium groups.

12. The polymer of claim 1 wherein the monocarboxylic acid is a nitrobenzoic acid.

13. A dispersion comprising:
water and/or a non-polar solvent;
a color pigment; and
a polymer that comprises the reaction product of A, B, and C and optionally D wherein:
A is a polyepoxide that is:
the condensation product of phenol, formaldehyde, and epichlorohydrin;
the condensation product of bisphenol A, formaldehyde, and epichlorohydrin; or
a combination of said condensation products;
B is at least one polyoxyalkylene with a terminal primary amine group wherein each polyoxyalkylene comprises an ethyleneoxy moiety and a propyleneoxy moiety and independently has the following structure:

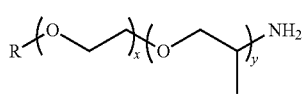

wherein R is a hydrogen atom or a $C_1$-$C_4$ group, and
wherein each of x and y is independently from 0 to about 500 and x+y>0; and
C is an anchoring compound that is:
a secondary amine;
a monocarboxylic acid that is aromatic;
a cyclic imide; or
a combination thereof; and
D is an alkylating agent,
wherein the reaction product of A, B, and C is further defined as a reaction product wherein moles of epoxide group on A that is reacted is approximately equal to moles of C reacted +2×moles of B reacted, plus or minus about 5 mole%.

14. The dispersion of claim 13 that is solvent borne and that comprises the non-polar solvent,
wherein (A) has the structure as follows wherein n is an average of about 2.4:

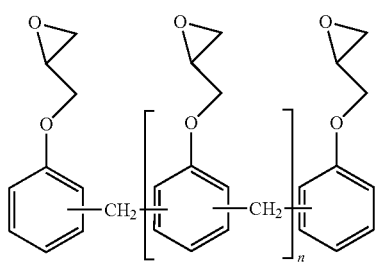

wherein (B) comprises a compound that has the structure as follows wherein R is methyl, x is about 6, and y is 29:

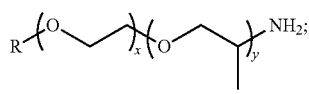

and wherein (C) is p-nitro benzoic acid.

15. The dispersion of claim 13 that is waterborne and that comprises water, wherein (A) has the structure as follows wherein n is an average of about 1.5:

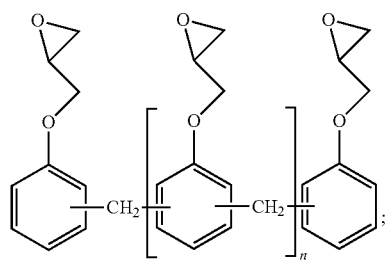

wherein (B) has the structure as follows wherein R is methyl, x is about 33, and y is about 10:

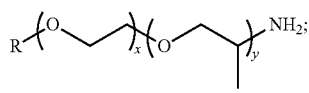

and wherein (C) is p-nitro benzoic acid.

16. The dispersion of claim 13 that is waterborne and that comprises water, wherein (A) has the structure as follows wherein n is an average of about 1.5:

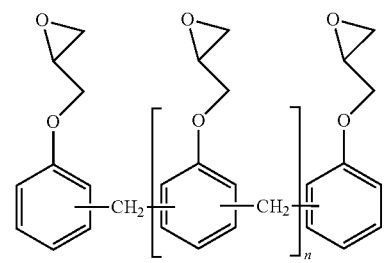

wherein (B) has the structure as follows wherein R is methyl, x is about 33, and y is about 10:

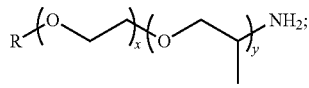

and wherein (C) is n-benzylmethyl amine.

17. The dispersion of claim 13 that is waterborne and that comprises water, wherein (A) has the structure as follows wherein n is an average of about 0.5:

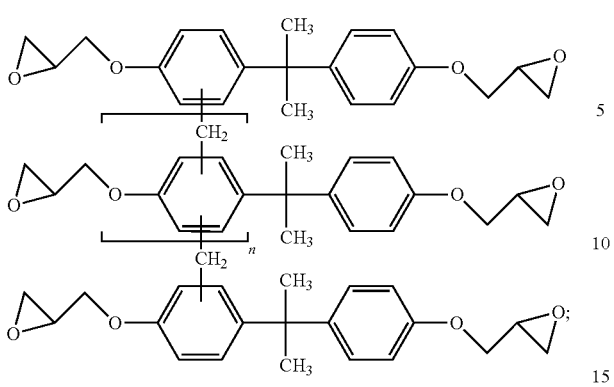

wherein (B) comprises a compound that has the structure as follows wherein R is methyl, x is about 58, and y is about 8:

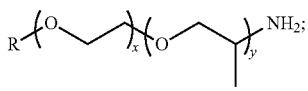

wherein (B) further comprises a compound that has the structure as follows wherein R is methyl, x is about 6, and y is about 29:

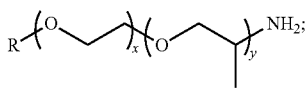

and
wherein (C) is p-nitro benzoic acid.

18. The dispersion of claim 13 that is waterborne and that comprises water, wherein (A) has the structure as follows wherein n is an average of about 2.4:

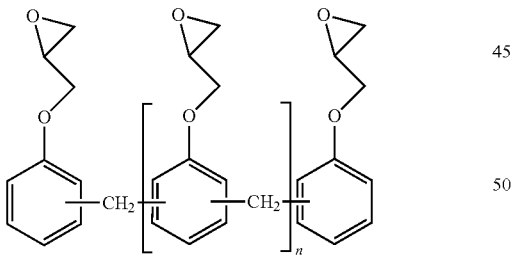

wherein (B) comprises a compound that has the structure as follows wherein R is methyl, x is about 33, and y is about 10:

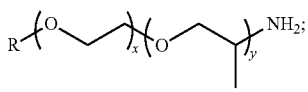

and
wherein (C) is N-Benzylmethyl amine; and
wherein (D) is methyl-p-toluene sulfonate.

19. A composition comprising:
a compound that is optionally a particulate solid; and
a polymer that comprises the reaction product of A, B, and C, and optionally D, wherein:
  A is a polyepoxide that is:
    the condensation product of phenol, formaldehyde, and epichlorohydrin;
    the condensation product of bisphenol A, formaldehyde, and epichlorohydrin; or
    a combination of said condensation products;
  B is at least one polyoxyalkylene with a terminal primary amine group wherein each polyoxyalkylene comprises an ethyleneoxy moiety and a propyleneoxy moiety and independently has the following structure:

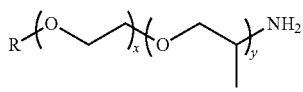

wherein R is a hydrogen atom or a $C_1$-$C_4$ group, and
    wherein each of x and y is independently from 0 to about 500 and x+y>0;
  C is an anchoring compound that is:
    a secondary amine;
    a monocarboxylic acid that is aromatic;
    a cyclic imide; or
    a combination thereof; and
  D is an alkylating agent,
wherein the reaction product of A, B, and C is further defined as a reaction product wherein moles of epoxide group on A that is reacted is approximately equal to moles of C reacted +2×moles of B reacted, plus or minus about 5 mole%.

20. A dispersion comprising:
an organic solvent;
a color pigment; and
a polymer that comprises the reaction product of A, B, and C and optionally D wherein:
  A is a polyepoxide that is:
    the condensation product of phenol, formaldehyde, and epichlorohydrin;
    the condensation product of bisphenol A, formaldehyde, and epichlorohydrin; or
    a combination of said condensation products;
  B is at least one polyoxyalkylene with a terminal primary amine group wherein each polyoxyalkylene comprises an ethyleneoxy moiety and a propyleneoxy moiety and independently has the following structure:

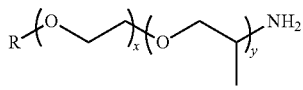

wherein R is a hydrogen atom or a $C_1$-$C_4$ group, and
    wherein each of x and y is independently from 0 to about 500 and x+y>0; and C is an anchoring compound that is:
  a secondary amine;
  a monocarboxylic acid that is aromatic;
  a cyclic imide; or
  a combination thereof; and
D is an alkylating agent,
wherein the reaction product of A, B, and C is further defined as a reaction product wherein moles of epoxide group on A that is reacted is approximately equal to moles of C reacted +2×moles of B reacted, plus or minus about 5 mole%.

* * * * *